United States Patent [19]

Malatesta et al.

[11] 4,447,304
[45] May 8, 1984

[54] PRODUCTION OF CARBONYL FLUORIDE

[75] Inventors: Vincenzo Malatesta; Clive Willis; Peter A. Hackett, all of Ottawa, Canada

[73] Assignee: Canadian Patents & Development Limited, Ottawa, Canada

[21] Appl. No.: 350,742

[22] Filed: Feb. 22, 1982

[30] Foreign Application Priority Data

May 15, 1981 [CA] Canada ................................. 377708

[51] Int. Cl.³ ............................................. B01J 19/12
[52] U.S. Cl. ........................................... 204/157.1 R
[58] Field of Search ................. 204/157.1 C, 157.1 A, 204/157.1 R

[56] References Cited

U.S. PATENT DOCUMENTS 4,000,051 12/1976 Kaldor ......................... 204/157.1 R
4,311,674 1/1982 Janner et al. ................. 204/157.1 R Primary Examiner—Howard S. Williams
Attorney, Agent, or Firm—James R. Hughes; Alan A. Thomson

[57] ABSTRACT

A method of producing carbonyl fluoride by multiphoton decomposition of carbon dioxide-sulphur hexafluoride mixtures comprising irradiating gaseous carbon dioxide-sulphur hexafluoride mixtures in a reaction chamber at a pressure in the 10–50 Torr range with a laser beam at a frequency of about 944 wavenumbers and passing the material from the reaction chamber after irradiation through a chemical processing stage to obtain a carbonyl fluoride product.

2 Claims, 3 Drawing Figures

PRODUCTION OF CARBONYL FLUORIDE

This invention relates to the formation of carbonyl fluoride and more particularly to a method of production of this material by laser enhanced fluorination of carbon dioxide by sulfur hexafluoride.

The separation of isotopes using photochemical techniques especially laser irradiation is well known and fairly widely used. The following are representative patents in this field:

U.S. Pat. No. 3,983,020 C. B. Moore, Sept. 28, 1976, 204-157. 1

U.S. Pat. No. 4,000,420 S. E. Harris, Dec. 28, 1976, 250-281

U.S. Pat. No. 4,023,038 G. S. Janes et al., May 10, 1977, 250-423

U.S. Pat. No. 4,038,549 G. S. Janes et al., July 26, 1977, 250-423

U.S. Pat. No. 4,060,732 D. Rosenberger, Nov. 29, 1977, 250-432

U.S. Pat. No. 4,120,767 S. N. Bitterson et al., Oct. 17, 1978, 204-158

Formation of carbonyl fluoride ($CF_2O$) from carbon monoxide (CO) or carbon dioxide ($CO_2$) requires extreme conditions and is achieved with relatively low yields. The high temperature reaction of sulfur hexafluoride ($SF_6$) with $CO_2$ gives only 10% $CF_2O$ with $CF_4$ being the main carbon bearing product. See W. R. Hasek, W. C. Smith and V. A. Engelhardt, J. Amer. Chem. Soc., 1960, 82, 543. Better yields (about 45%) of $CF_2O$ are obtained during the electrolysis of carbon monoxide in liquid hydrofluoric acid (HF). See T. Nagase, H. Baba and T. Abe, Japanese Pat. No. 7026611, 1970. Other products in this method are $CF_4$ (26%), $CF_3OF$ (5%) and $CO_2$ (23%). Direct fluorination of $CO_2$ gives $CF_2(OF)_2$ as the dominant product. See R. L. Cauble and G. H. Cady, J.Amer. Chem. Soc. 1967, 89, 1962 and F. A. Hokoret and J. M. Shreeve, J. Amer. Chem. Soc., 1967, 89, 1809.

It is an object of the present invention to provide a process for converting carbon dioxide to carbonyl fluoride giving high yields but with no detectable carbon bearing side products.

This and other objects of the invention are achieved by a method of producing carbonyl fluoride by multiphoton decomposition of carbon dioxide-sulphur hexafluoride mixtures comprising irradiating gaseous carbon dioxide-sulphur hexafluoride mixtures in a reaction chamber at a pressure in the 10–50 Torr range with a laser beam at a frequency of about 944 wavenumbers causing the following reaction to take place:

and passing the material from the reaction chamber after irradiation through a chemical processing stage to obtain a carbonyl fluoride product.

In drawings which illustrate an embodiment of the invention,

Figure 1:
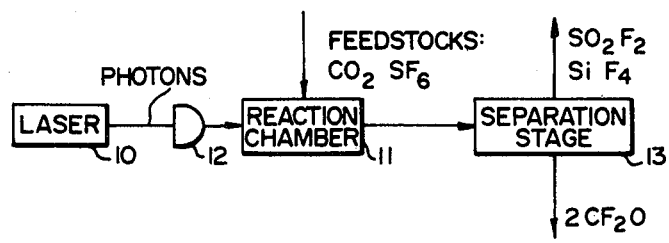
FIG. 1 is a schematic drawing of the irradiation apparatus.

Referring to FIG. 1, laser 10, preferably a $CO_2$-laser, irradiates a $CO_2$-$SF_6$ mixture in reaction chamber 11 at a pressure in the 10–50 Torr range. The laser beam is preferably focussed at the centre of the reaction chamber by means of a short focal length lens 12. The P (20) line of the 10.6 μm band (approx. 944 wavenumbers) of the laser is used and it is very strongly absorbed by the $SF_6$ component of the mixture. The process involves plasma breakdown or multiphoton decomposition in the mixture with the overall equation being:

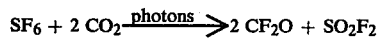

After laser irradiation, the mixture is passed to separation stage 13 where $CF_2O$ is separated from the $SO_2F_2$. The only other product obtained is $SiF_4$ which is presumed to be formed by interaction with the glass walls of the cell (reaction chamber) used.

In an experimental test, the mixture was contained in a 10 cm long. 2.4 cm diameter IR cell with a TEA $CO_2$-laser beam focussed at the centre of the cell by a 7.5 cm focal length germanium lens. Laser pulses of 4–6 joules per pulse were used. $CO_2$ at a pressure of 3.8 Torr and $SF_6$ at a pressure of 4 Torr were introduced into the IR cell and after four freeze-pump-thaw cycles, the gas mixture was irradiated. After 10 pulses (all giving rise to plasma breakdown) 93.5% of the $SF_6$ was found to be decomposed and only traces of $CO_2$ were still present. Similar behaviour was noted for higher pressure mixtures although as the pressure was increased more pulses were found to be necessary, for example at 10 Torr $SF_6$, 10 Torr $CO_2$, 200 pulses were found to be required to decompose all the $SF_6$. Prolonged irradiation after the $SF_6$ is decomposed leads to a steady, slow decline in the $CF_2O$ content with an apparent regrowth in the $CO_2$. The $CO_2$ is quantitatively transformed to $CF_2O$ but to achieve this, it is necessary to have excess (>2:1)$SF_6$ to obviate the laser induced back reaction.

Figures 2, 3:
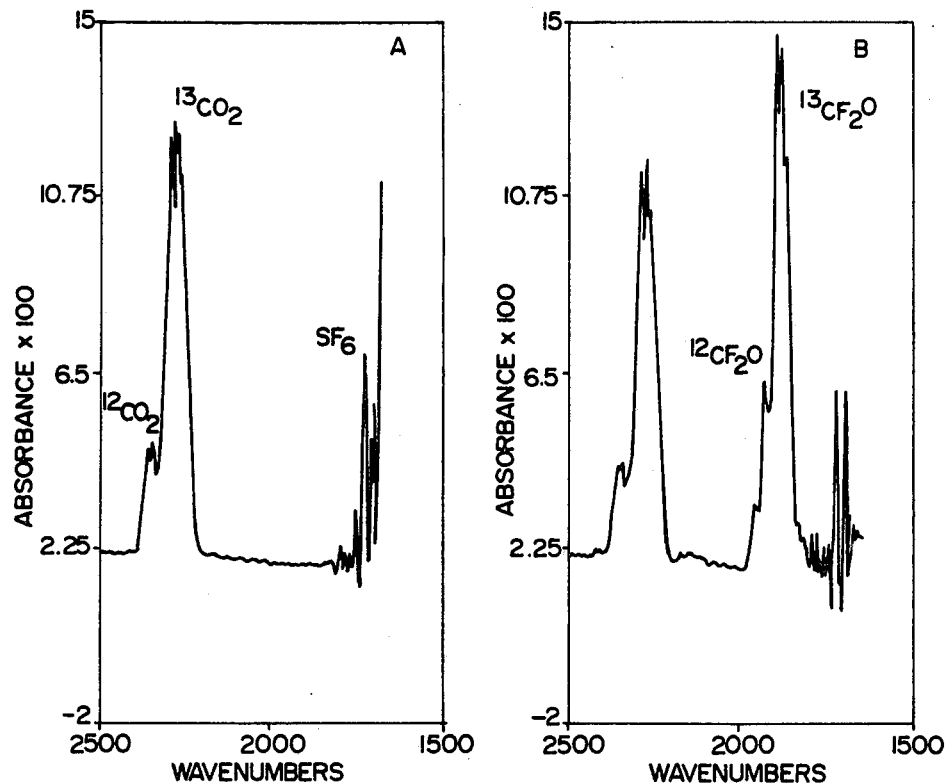
FIG. 2 is a graph showing infrared spectral traces of a $CO_2$, $SF_6$ mixture before irradiation.
FIG. 3 is a graph showing infrared spectral traces of the mixture after small fraction of the $CO_2$ has been reacted.

The effectiveness and integrity of the method is shown by FIGS. 2 and 3. FIG. 3 shows the spectrum before irradiation where $CO_2$(90% C-13) and $SF_6$ are mixed.

FIG. 3 shows the composition of the mixture after a small fraction of the $CO_2$ has been reacted. It can be seen that the isotopic composition of the $CF_2O$ product exactly matches the initial composition of the $CO_2$ substrate.

We claim:

1. A method of producing carbonyl fluoride by multiphoton decomposition of carbon dioxide-sulphur hexafluoride mixtures comprising:
   (a) irradiating gaseous carbon dioxide-sulphur hexafluoride mixtures in a reaction chamber at a pressure in the 10–50 Torr range with a laser beam at a frequency of about 944 wavenumbers causing the following reaction to take place:

and
   (b) passing the material from the reaction chamber after irradiation through a chemical processing stage to obtain a carbonyl fluoride product.

2. A method as in claim 1 wherein the irradiation is carried out by a $CO_2$ laser focussed on the central region of the reaction chamber.

* * * * *